(12) United States Patent
Kim et al.

(10) Patent No.: US 12,454,591 B2
(45) Date of Patent: Oct. 28, 2025

(54) THERMOPLASTIC RESIN COMPOSITION INCLUDING (METH)ACRYLATE GRAFT COPOLYMER AND METHOD OF PREPARING THERMOPLASTIC RESIN COMPOSITION

(71) Applicant: LG CHEM, LTD., Seoul (KR)

(72) Inventors: Min Jung Kim, Daejeon (KR); Yong Yeon Hwang, Daejeon (KR); Bong Keun Ahn, Daejeon (KR); Jang Won Park, Daejeon (KR); Seyong Kim, Daejeon (KR); Jiyoon Jeon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 785 days.

(21) Appl. No.: 17/299,703

(22) PCT Filed: Aug. 10, 2020

(86) PCT No.: PCT/KR2020/010532
§ 371 (c)(1),
(2) Date: Jun. 3, 2021

(87) PCT Pub. No.: WO2021/040269
PCT Pub. Date: Mar. 4, 2021

(65) Prior Publication Data
US 2022/0056183 A1    Feb. 24, 2022

(30) Foreign Application Priority Data

Aug. 30, 2019 (KR) .................. 10-2019-0107752
Aug. 7, 2020 (KR) .................. 10-2020-0099223

(51) Int. Cl.
*C08F 265/06* (2006.01)
*B29C 48/00* (2019.01)
*C08F 212/08* (2006.01)
*C08F 220/14* (2006.01)
*C08F 220/18* (2006.01)
*C08F 220/40* (2006.01)
*C08F 220/44* (2006.01)
*C08F 222/10* (2006.01)
*C08L 51/00* (2006.01)

(52) U.S. Cl.
CPC .......... *C08F 265/06* (2013.01); *B29C 48/022* (2019.02); *C08F 212/08* (2013.01); *C08F 220/14* (2013.01); *C08F 220/1804* (2020.02); *C08F 220/40*; *C08F 220/44* (2013.01); *C08F 222/102* (2020.02); *C08L 51/003* (2013.01); *C08L 2205/22* (2013.01); *C08L 2207/53* (2013.01)

(58) Field of Classification Search
CPC .............. C08F 265/06; C08F 220/1804; C08F 222/102; C08F 212/08; C08F 220/14; C08F 220/40; C08F 220/44; B29C 48/022; C08L 51/003
See application file for complete search history.

(56) References Cited

U.S. PATENT DOCUMENTS

| | | | | |
|---|---|---|---|---|
| 2004/0152821 A1* | 8/2004 | Saegusa | ............. | C08L 51/04 524/458 |
| 2009/0043047 A1* | 2/2009 | Ha | ............. | C08L 51/003 525/85 |
| 2014/0187704 A1* | 7/2014 | Kwon | ............. | C08F 265/06 524/504 |
| 2019/0023892 A1* | 1/2019 | Kwon et al. | ............. | C08L 33/12 524/504 |

FOREIGN PATENT DOCUMENTS

| | | |
|---|---|---|
| CN | 103910967 A | 7/2014 |
| CN | 108473748 A | 8/2018 |
| CN | 110167978 A | 8/2019 |
| JP | H1-168752 A | 7/1989 |
| JP | H01168752 A | 7/1989 |
| JP | H9-48922 A | 2/1997 |
| JP | 3563166 B2 | 9/2004 |
| KR | 10-2007-0029667 | 3/2007 |
| KR | 10-0815995 B | 3/2008 |
| KR | 10-2012-0076031 A | 7/2012 |
| KR | 10-1333578 | 11/2013 |
| KR | 10-2014-0005510 A | 1/2014 |
| KR | 10-2014-0027872 A | 3/2014 |

(Continued)

OTHER PUBLICATIONS

Kim KR 101,333,578 B1 (English Machine Translation obtained from www.KIPRIS.kr) (Year: 2013).*
De Gennes, P. G. Scaling Concepts in Polymer Physics. Cornell University Press, 1979. (Year: 1979).*

(Continued)

*Primary Examiner* — Robert C Boyle

(57) ABSTRACT

The present invention relates to a thermoplastic resin composition including a (meth)acrylate graft copolymer and a method of preparing the thermoplastic resin composition. According to the present invention, the thermoplastic resin composition includes a graft copolymer (A) containing an alkyl acrylate rubber core and an alkyl methacrylate compound (co)polymer shell surrounding the alkyl acrylate rubber core; and a matrix resin (B). In this case, the rubber core has an average particle diameter of 40 to 100 nm, the graft copolymer (A) has a grafting degree of 20 to 100%, and the thermoplastic resin composition has a refractive index of greater than 1.46 and less than 1.49 and a blackness (L value) of less than 25.0.

11 Claims, No Drawings

(56) References Cited

FOREIGN PATENT DOCUMENTS

| | | |
|---|---|---|
| KR | 10-2015-0026404 A | 3/2015 |
| KR | 10-2015-0067573 A | 6/2015 |
| KR | 10-2016-0035579 A | 3/2016 |
| KR | 10-1656798 B | 9/2016 |
| KR | 10-1692106 | 1/2017 |
| KR | 10-2019-0071572 A | 6/2019 |
| TW | 200804496 A | 1/2008 |
| TW | 201434940 A | 9/2014 |

OTHER PUBLICATIONS

Extended European Search Report for related European Application EP 20856370.0, mailed Jan. 25, 2022.

* cited by examiner

THERMOPLASTIC RESIN COMPOSITION INCLUDING (METH)ACRYLATE GRAFT COPOLYMER AND METHOD OF PREPARING THERMOPLASTIC RESIN COMPOSITION

This application is a National Phase of International Application No. PCT/KR2020/010532 which claims priority to Korean Patent Application Nos. 10-2019-0107752, filed on Aug. 30, 2019 and 10-2020-0099223, filed on Aug. 7, 2020 in the Korean Intellectual Property Office, the disclosures of which are incorporated herein by reference.

CROSS-REFERENCE TO RELATED APPLICATION

This application claims priority to Korean Patent Application No. 10-2019-0107752, filed on Aug. 30, 2019 in the Korean Intellectual Property Office, the disclosure of which is incorporated herein by reference.

TECHNICAL FIELD

The present invention relates to a thermoplastic resin composition including a (meth)acrylate graft copolymer and a method of preparing thermoplastic resin the composition. More specifically, the thermoplastic resin composition of the present invention has excellent impact strength and weather resistance and, in particular, has an advantage in expressing a deep black color due to excellent colorability.

BACKGROUND ART

Acrylonitrile-butadiene-styrene resins (hereinafter referred to as "ABS resins") based on conjugated diene rubber have excellent processability, mechanical properties, and appearance properties, and thus are used in various fields, such as parts of electrical and electronic products, automobiles, small toys, furniture, and building materials. However, since ABS resins are based on butadiene rubber containing chemically unstable unsaturated bonds, a rubber polymer is easily aged by ultraviolet light, which deteriorates weather resistance of the ABS resins. To overcome this problem, painted ABS resins are sometimes used. However, painting causes environmental pollution. In addition, painted products are difficult to recycle, and durability thereof deteriorates.

To overcome the above-described limitations of ABS resins, alkyl acrylate-aromatic vinyl compound-vinyl cyanide compound graft copolymers (hereinafter referred to as "ASA resins") without ethylenically unsaturated bonds are used. Although ASA resins have resistance, impact weather resistance, and colorability superior to ABS resins, painted ASA resin products have poor appearance properties such as colorability compared to painted ABS resin products. In addition, as the level of weather resistance required by the market gradually increases, these resins are limited in meeting this requirement.

Therefore, a resin that has colorability superior to conventional ABS resins or ASA resins and has excellent weather resistance and impact strength needs to be developed.

RELATED ART DOCUMENTS

Patent Documents

KR 10-0815995 B1

DISCLOSURE

Technical Problem

Therefore, the present invention has been made in view of the above problems, and it is one object of the present invention to provide a thermoplastic resin composition including a (meth)acrylate graft copolymer and a method of preparing the thermoplastic resin composition. The thermoplastic resin composition of the present invention has excellent impact strength and weather resistance and, in particular, has an advantage in expressing a deep black color due to excellent colorability.

It is another object of the present invention to provide a molded article manufactured using the thermoplastic resin composition of the present invention.

The above and other objects can be accomplished by the present disclosure described below.

Technical Solution

In accordance with one aspect of the present invention, provided is a thermoplastic resin composition including a (meth)acrylate graft copolymer and a method of preparing the thermoplastic resin composition, wherein the thermoplastic resin composition includes a graft copolymer (A) containing an alkyl (meth)acrylate rubber core and an alkyl methacrylate compound (co)polymer shell surrounding the alkyl (meth)acrylate rubber core; and a matrix resin (B), wherein the rubber core has an average particle diameter of 40 to 100 nm, the graft copolymer (A) has a grafting degree of 20 to 100%, and the thermoplastic resin composition has a refractive index of greater than 1.46 and less than 1.49 and a blackness (L value) of less than 25.0.

Advantageous Effects

According to the present invention, a thermoplastic resin composition including a (meth)acrylate graft copolymer, characterized in that the thermoplastic resin composition has excellent impact strength and weather resistance and, in particular, has an advantage in expressing a deep black color due to excellent colorability, a method of preparing the thermoplastic resin composition, and a molded article manufactured using the thermoplastic resin composition can be provided.

BEST MODE

Hereinafter, a thermoplastic resin composition including a (meth)acrylate graft copolymer, a method of preparing the thermoplastic resin composition, and a molded article manufactured using the thermoplastic resin composition according to the present invention will be described in detail.

The present inventors confirmed that, in the preparation of a thermoplastic resin composition including a (meth)acrylate graft copolymer and a matrix resin, when the rubber size and grafting degree of the graft copolymer were controlled to be within predetermined ranges, respectively, and the total refractive index of the thermoplastic resin composition controlled to be within a predetermined range, weather resistance and colorability were significantly improved while maintaining impact strength. Based on these results, the present inventors conducted further studies to complete the present invention.

The thermoplastic resin composition of the present invention is a thermoplastic resin composition including a graft copolymer (A) containing an alkyl (meth)acrylate rubber core and an alkyl methacrylate compound (co)polymer shell surrounding the alkyl (meth)acrylate rubber core; and a matrix resin (B). In this case, the rubber core has an average particle diameter of 40 to 100 nm, the graft copolymer (A) has a grafting degree of 20 to 100%, and the thermoplastic resin composition has a refractive index of greater than 1.46 and less than 1.49. Within this range, the thermoplastic resin composition may have excellent impact strength and weather resistance and, in particular, may have an advantage in expressing a deep black color due to excellent colorability.

In addition, the present invention may include a thermoplastic resin composition including a graft copolymer (A) containing an alkyl (meth)acrylate rubber core and an alkyl methacrylate compound (co)polymer shell surrounding the alkyl (meth)acrylate rubber core; and a matrix resin (B), wherein the rubber core has an average particle diameter of 40 to 100 nm, the graft copolymer (A) has a grafting degree of 20 to 100%, and the thermoplastic resin composition has a refractive index of greater than 1.46 and less than 1.49 and a blackness (L value) of less than 25.0. Within this range, the thermoplastic resin composition may have excellent impact strength and weather resistance and, in particular, may have an advantage in expressing a deep black color due to excellent colorability.

In addition, the present invention may include a thermoplastic resin composition including a graft copolymer (A) containing an alkyl (meth)acrylate rubber core and an alkyl methacrylate compound (co)polymer shell surrounding the alkyl (meth)acrylate rubber core; and a matrix resin (B), wherein the rubber core has an average particle diameter of 40 to 100 nm, the graft copolymer (A) has a grafting degree of 20 to 100%, the thermoplastic resin composition has a refractive index of greater than 1.46 and less than 1.49, and difference in refractive index between the rubber core, the (co)polymer shell, and the matrix resin is less than 0.04. Within this range, the thermoplastic resin composition may have excellent impact strength and weather resistance and, in particular, may have an advantage in expressing a deep black color due to excellent colorability.

Hereinafter, each component of the thermoplastic resin composition of the present invention will be described.

a) Graft Copolymer

A graft copolymer according to the present invention contains an alkyl (meth)acrylate rubber core and an alkyl methacrylate compound (co)polymer shell surrounding the alkyl (meth)acrylate rubber core. In this case, weather resistance and colorability may be excellent.

For example, the rubber core may have an average particle diameter of 40 to 120 nm, preferably 50 to 110 nm, more preferably 60 to 110 nm, still more preferably 60 to 100 nm, still more preferably 70 to 100 nm, most preferably 80 to 100 nm. Within this range, weather resistance may be significantly improved, and colorability may be excellent.

For example, the rubber core may include an alkyl acrylate and an alkyl methacrylate. In this case, weather resistance may be further improved.

For example, the alkyl methacrylate may be included in an amount of 0 to 30% by weight, preferably 1 to 20% by weight, more preferably 3 to 10% by weight, in the rubber core. Within this range, weather resistance may be improved without deterioration in impact resistance.

For example, the rubber core may further include one or more selected from the group consisting of aromatic vinyl compounds and vinyl cyanide compounds. In this case, appearance properties may be excellent.

For example, based on 100% by weight in total of monomers used to prepare a core, the rubber core may include 0 to 30% by weight, 0 to 20% by weight, 0.1 to 30% by weight, or 0.1 to 20% by weight of one or more selected from the group consisting of aromatic vinyl compounds and vinyl cyanide compounds. Within this range, appearance properties may be excellent.

As a specific example, based on 100% by weight in total of monomers used to prepare a core, the rubber core may include 0 to 20% by weight of the aromatic vinyl compound and 0 to 10% by weight of the vinyl cyanide compound, preferably 0.1 to 20% by weight of the aromatic vinyl compound and 0.1 to 10% by weight of the vinyl cyanide compound, more preferably 0.1 to 10% by weight of the aromatic vinyl compound and 0.1 to 5% by weight of the vinyl cyanide compound. Within this range, appearance properties may be excellent.

Difference in refractive index between the rubber core and the (co)polymer shell or between the rubber core and the matrix resin is preferably 0.03 or less, as a preferable example, 0.015 to 0.03, more preferably less than 0.03, as a more preferable example, greater than 0.015 and less than 0.03, as a still more preferable example, greater than 0.012 and less than 0.03, as a most preferable example, greater than 0.015 and less than 0.03. Within this range, colorability may be excellent.

In the present invention, difference in refractive index between certain components refers to difference between the minimum refractive index and the maximum refractive index thereamong.

In the present invention, the alkyl (meth)acrylate includes an alkyl acrylate and an alkyl methacrylate.

In the present invention, the alkyl acrylate may be, for example, an alkyl acrylate containing an alkyl group having 1 to 15 carbon atoms and, as a specific example, may include one or more selected from the group consisting of methyl acrylate, ethyl acrylate, propyl acrylate, butyl acrylate, 2-ethylbutyl acrylate, octyl acrylate, 2-ethylhexyl acrylate, hexyl acrylate, heptyl acrylate, n-pentyl acrylate, and lauryl acrylate, preferably an alkyl acrylate containing an alkyl group having 1 to 4 carbon atoms, more preferably butyl acrylate.

In the present invention, the alkyl methacrylate may be, for example, an alkyl methacrylate containing an alkyl group having 1 to 15 carbon atoms and, as a specific example, may include one or more selected from the group consisting of methyl methacrylate, ethyl methacrylate, butyl methacrylate, 2-ethylbutyl methacrylate, 2-ethylhexyl methacrylate, and lauryl methacrylate, preferably an alkyl methacrylate containing an alkyl group having 1 to 4 carbon atoms, more preferably methyl methacrylate.

In the present invention, a polymer including a certain compound refers to a polymer prepared by polymerizing the compound, and one unit in the polymerized polymer is derived from the compound.

For example, based on 100 parts by weight in total of monomers used to prepare a graft copolymer, the rubber core may include 0.01 to 3 parts by weight, preferably 0.1 to 1 part by weight of a crosslinking agent. Within this range, the impact resistance and weather resistance of a resin may be improved.

As a specific example, based on 100 parts by weight in total of monomers used to prepare a graft copolymer, the rubber core may be prepared by adding 0.01 to 3 parts by weight of a crosslinking agent, 0.01 to 3 parts by weight of an initiator, and 0.01 to 5 parts by weight of an emulsifier and performing polymerization. Within this range, the impact resistance and weather resistance of a resin may be improved.

For example, the rubber core may include a polymer seed.

For example, based on 100 parts by weight in total of monomers used to prepare a graft copolymer, the polymer seed may include 1 to 30 parts by weight, preferably 3 to 20 parts by weight, more preferably 4 to 15 parts by weight of one or more monomers selected from an alkyl acrylate and an alkyl methacrylate. Within this range, impact resistance, weather resistance, and physical property balance may be excellent.

For example, based on 100% by weight in total of monomers used to prepare a seed, the polymer seed may include 0 to 30% by weight, preferably 1 to 20% by weight, more preferably 3 to 10% by weight of an alkyl methacrylate monomer. Within this range, impact resistance, weather resistance, and physical property balance may be excellent.

For example, based on 100% by weight in total of monomers used to prepare a seed, the polymer seed may include 0 to 20% by weight of the aromatic vinyl compound and 0 to 10% by weight of the vinyl cyanide compound, or may include 0.1 to 20% by weight of the aromatic vinyl compound and 0.1 to 10% by weight of the vinyl cyanide compound. As an example, the polymer seed may include 0.1 to 10% by weight of the aromatic vinyl compound and 0.1 to 5% by weight of the vinyl cyanide compound. Within this range, appearance properties may be improved.

As a preferred example, the polymer seed may not include an aromatic vinyl compound, a vinyl cyanide compound, or both.

As a specific example, based on 100 parts by weight in total of monomers used to prepare a graft copolymer, the polymer seed may be prepared by polymerizing 0.01 to 3 parts by weight of a crosslinking agent, 0.01 to 3 parts by weight of an initiator, and 0.01 to 5 parts by weight of an emulsifier. Within this range, polymers having a uniform size may be prepared within a short time, and the physical properties of the polymers, such as weather resistance and impact resistance, may be further improved.

As another specific example, based on 100 parts by weight in total of monomers used to prepare a graft copolymer, the polymer seed may be prepared by polymerizing 0.1 to 1 part by weight of a crosslinking agent, 0.01 to 1 part by weight of an initiator, and 0.5 to 1.5 parts by weight of an emulsifier. Within this range, polymers having a uniform size may be prepared within a short time, and the physical properties of the polymers, such as weather resistance and impact resistance, may be further improved.

Preferably, the polymer seed is prepared by polymerizing an alkyl acrylate alone or by copolymerizing an alkyl acrylate and an alkyl methacrylate. When necessary, an aromatic vinyl compound and/or a vinyl cyanide compound may be additionally used when preparing the polymer seed. In this case, weather resistance and mechanical strength may be further improved.

For example, the polymer seed may have an average particle diameter of 10 to 60 nm, preferably 30 to 60 nm, more preferably 30 to 50 nm, most preferably 30 to 40 nm. Within this range, weather resistance and colorability may be excellent.

When preparing the polymer seed, one or more of an electrolyte and a grafting agent may be optionally included.

For example, based on 100 parts by weight in total of monomers used to prepare a graft copolymer, the electrolyte may be included in an amount of 0.005 to 1 part by weight, 0.01 to 1 part by weight, or 0.05 to 1 part by weight. Within this range, polymerization efficiency and latex stability may be improved.

In the present invention, the electrolyte may include, for example, one or more selected from the group consisting of KCl, NaCl, KHCO$_3$, NaHCO$_3$, K$_2$CO$_3$, Na$_2$CO$_3$, KHSO$_3$, NaHSO$_3$, K$_4$P$_2$O$_7$, Na$_4$P$_2$O$_7$, K$_3$PO$_4$, Na$_3$PO$_4$, K$_2$HPO$_4$, Na$_2$HPO$_4$, KOH, NaOH, and Na$_2$S$_2$O$_7$, without being limited thereto.

For example, based on 100 parts by weight in total of monomers used to prepare a graft copolymer, the grafting agent may be included in an amount of 0.01 to 3 parts by weight, 0.01 to 1 part by weight, or 0.01 to 0.5 parts by weight. Within this range, the grafting degree of a graft polymer may be improved, and other physical properties may be improved.

In the present invention, unless otherwise defined, grafting agents commonly used in the art to which the present invention pertains may be used as the grafting agent of the present invention, without particular limitation. For example, a compound including two or more unsaturated vinyl groups having different reactivities may be used as the grafting agent. For example, one or more selected from allyl methacrylate, triallyl isocyanurate, triallyl amine, and diallyl amine may be used, without being limited thereto.

In the present invention, the (co)polymer may include a polymer and a copolymer.

For example, an alkyl methacrylate included in the (co)polymer shell may be included in an amount of 65 to 100% by weight, preferably 80 to 99.5% by weight, more preferably 85 to 95% by weight in the (co)polymer shell. Within this range, impact strength and weather resistance may be excellent.

For example, the (co)polymer shell may further include an alkyl acrylate. In this case, impact strength may be excellent.

For example, an alkyl acrylate included in the (co)polymer shell may be included in an amount of 0.1 to 20% by weight, preferably 5 to 15% by weight in the (co)polymer shell. Within this range, impact strength may be excellent.

When necessary, the (co)polymer shell may further include one or more selected from the group consisting of aromatic vinyl compounds and vinyl cyanide compounds. In this case, impact strength may be improved.

For example, difference in refractive index between the (co)polymer shell and the matrix resin may be 0.005 or less, preferably less than 0.005, more preferably 0.003 or less, still more preferably 0.0025 or less, most preferably 0.0021 or less. Within this range, colorability may be excellent.

For example, based on 100% by weight in total of monomers used to prepare a shell, the (co)polymer shell may include 0 to 10% by weight of the aromatic vinyl compound and 0 to 5% by weight of the vinyl cyanide compound, preferably 0.1 to 10% by weight of the aromatic vinyl compound and 0.1 to 5% by weight of the vinyl cyanide compound, more preferably 0.1 to 5% by weight of the aromatic vinyl compound and 0.1 to 2.5% by weight of the vinyl cyanide compound. Within this range, appearance properties may be excellent.

In the present invention, the aromatic vinyl compound may include, for example, one or more selected from styrene, α-methylstyrene, p-methylstyrene, and vinyl toluene, preferably styrene, without being limited thereto.

In the present invention, the vinyl cyanide compound may include, for example, one or more selected from acrylonitrile, methacrylonitrile, and ethacrylonitrile, preferably acrylonitrile, without being limited thereto.

Emulsifiers commonly used in the art to which the present invention pertains may be used as the emulsifier of the present invention without particular limitation. For example, the emulsifier may include one or more selected from the group consisting of low molecular weight carboxylates having 20 or fewer carbon atoms or 10 to 20 carbon atoms, such as rosinates, laurates, oleic acid salts, and stearates; alkyl sulfosuccinates having 20 or fewer carbon atoms or 10 to 20 carbon atoms or derivatives thereof; alkyl sulfates having 20 or fewer carbon atoms or 10 to 20 carbon atoms or sulfonates; polyfunctional carboxylic acids having 20 to 60 carbon atoms, 20 to 55 carbon atoms, or 30 to 55 carbon atoms and having two or more carboxyl groups, preferably 2 to 3 carboxyl groups or salts thereof; and one or more phosphoric acid salts selected from the group consisting of mono-alkyl ether phosphate and dialkyl ether phosphate.

As another example, the emulsifier may include one or more selected from the group consisting of reactive emulsifiers selected from sulfoethyl methacrylate, 2-acrylamido-2-methylpropane sulfonic acid, sodium styrene sulfonate, sodium dodecyl allyl sulfosuccinate, a copolymer of styrene and sodium dodecyl allyl sulfosuccinate, polyoxyethylene alkylphenyl ether ammonium sulfate, alkenyl C16-18 succinic acid di-potassium salt, and sodium methallyl sulfonate; and non-reactive emulsifiers selected from the group consisting of alkyl aryl sulfonates, alkali methyl alkyl sulfates, sulfonated alkylesters, fatty soap, and alkali salts of rosin acid.

In the present invention, the monomers refer to an alkyl acrylate, an alkyl methacrylate, an aromatic vinyl compound, and a vinyl cyanide compound.

For example, the graft copolymer (A) may have a grafting degree of 20 to 100%, preferably 30 to 80%, more preferably 40 to 70%. Within this range, appearance properties, such as colorability, and impact resistance may be excellent.

As a specific example, based on 100 parts by weight in total of monomers used to prepare a graft copolymer, the (co)polymer shell may be prepared by adding 20 to 80 parts by weight of an alkyl methacrylate, 0.01 to 5 parts by weight of an emulsifier, and 0.01 to 3 parts by weight of an initiator and performing graft polymerization. Within this range, weather resistance and impact resistance may be excellent.

Optionally, the (co)polymer shell may further include a molecular weight modifier. For example, based on 100 parts by weight in total of monomers used to prepare a graft copolymer, the molecular weight modifier may be included in an amount of 0.01 to 2 parts by weight, 0.05 to 2 parts by weight, or 0.05 to 1 part by weight. Within this range, a polymer having a desired size may be easily prepared.

In the present invention, "based on 100 parts by weight in total of monomers used to prepare a graft copolymer" means that a total weight of monomers used to prepare a seed, a core, and a shell constituting a graft copolymer is regarded as 100 parts by weight, and may be referred to as "based on 100 parts by weight in total of a graft copolymer" or "based on 100 parts by weight of a sum of a rubber core and monomers".

For example, the molecular weight modifier may include one or more selected from the group consisting of mercaptans such as α-methylstyrene dimer, t-dodecyl mercaptan, n-dodecyl mercaptan, and octyl mercaptan; halogenated hydrocarbons such as carbon tetrachloride, methylene chloride, and methylene bromide; and sulfur-containing compounds such as tetraethylthiuram disulfide, dipentamethylene thiuram disulfide, and diisopropylxanthogen disulfide, preferably mercaptan compounds such as tert-dodecyl mercaptan, without being limited thereto.

In the present invention, unless otherwise defined, crosslinking agents commonly used in the art to which the present invention pertains may be used as the crosslinking agent of the present invention without particular limitation. For example, the crosslinking agent may include acrylic compounds that contain an unsaturated vinyl group and may serve as a crosslinking agent. As a specific example, the crosslinking agent may include one or more selected form the group consisting of polyethylene glycol diacrylate, polyethylene glycol dimethacrylate, polypropylene glycol diacrylate, polypropylene glycol dimethacrylate, ethylene glycol diacrylate, ethylene glycol dimethacrylate, divinylbenzene, diethylene glycol dimethacrylate, triethylene glycol dimethacrylate, 1,3-butandiol dimethacrylate, hexanediol propoxylate diacrylate, neopentyl glycol dimethacrylate, neopentyl glycol ethoxylate diacrylate, neopentyl glycol propoxylate diacrylate, trimethylolpropane trimethacrylate, trimethylolmethane triacrylate, trimethylpropane ethoxylate triacrylate, trimethylpropane propoxylate triacrylate, pentaerythritol ethoxylate triacrylate, pentaerythritol propoxylate triacrylate, and vinyltrimethoxysilane, without being limited thereto.

In the present invention, initiators commonly used in the art to which the present invention pertains may be used as the initiator of the present invention without particular limitation. For example, the initiator may include water-soluble initiators, oil-soluble initiators, or mixtures thereof.

For example, the water-soluble initiator For may include one or more selected from the group consisting of sodium persulfate, potassium persulfate, ammonium persulfate, potassium perphosphate, and hydrogen peroxide, without being limited thereto.

For example, the oil-soluble initiator may include one or more selected from the group consisting of t-butyl peroxide, cumene hydroperoxide, p-methane hydroperoxide, di-t-butyl peroxide, t-butyl cumyl peroxide, acetyl peroxide, isobutyl peroxide, octanoyl peroxide, dibenzoyl peroxide, diisopropylbenzene hydroperoxide, 3,5,5-trimethylhexanol peroxide, t-butyl peroxy isobutyrate, azobisisobutyronitrile, azobis-2,4-dimethylvaleronitrile, azobiscyclohexanecarbonitrile, and azobis(isobutyric acid methyl), without being limited thereto.

In one or more of a step of preparing a polymer seed, a step of preparing a rubber core, and a step of preparing a (co)polymer shell according to the present invention, in addition to the above-described initiator, an activator is preferably included to further activate initiation reaction. More preferably, the activator is included in the step of preparing a (co)polymer shell.

The activator preferably includes one or more selected from the group consisting of sulfinato acetic acid metal salts and sulfonato acetic acid metal salts. In this case, weather resistance and colorability may be significantly improved while maintaining impact strength.

For example, the metal salt may be an alkali metal salt, preferably a sodium salt. In this case, weather resistance and colorability may be significantly improved while maintaining impact strength.

Preferably, the sulfinato acetic acid metal salt and the sulfonato acetic acid metal salt may each independently include one or more functional groups, and the functional groups preferably include a hydroxyl group. In this case, weather resistance and colorability may be significantly improved while maintaining impact strength.

As a specific example, the sulfinato acetic acid metal salts including a hydroxyl group as the functional group may include disodium 2-hydroxy-2-sulfonatolactate, and the sulfonato acetic acid metal salts including a hydroxyl group as the functional group may include disodium 2-hydroxy-2-sulfonatolactate. In this case, weather resistance and colorability may be significantly improved while maintaining impact strength.

Preferably, the activator includes a compound represented by Chemical Formula 1 below.

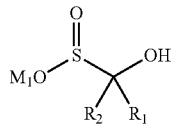

[Chemical Formula 1]

In Chemical Formula 1, $R_1$ and $R_2$ are the same or different from each other. $R_1$ and $R_2$ are each independently hydrogen, a C1 to C10 alkyl group, or —(C=O)OM$_2$, but both $R_1$ and $R_2$ are not hydrogen. $M_1$ and $M_2$ are the same or different from each other, and are each independently alkali metals.

When the compound represented by Chemical Formula 1 is used, the grafting degree of a graft copolymer may be significantly increased, thereby improving appearance properties including colorability.

In addition, in the case of the compound represented by Chemical Formula 1, although dextrose or sodium formaldehyde sulfoxylate as a conventional reducing agent is not used, and a compound containing a divalent iron ion, such as iron sulfate, as a conventional activator and sodium pyrophosphate or sodium ethylenediamine tetraacetate as a conventional chelating agent are used in small amounts compared to a conventional method, the high grafting degree of a graft copolymer may be secured. In particular, since dextrose, which is a reducing agent, is a material that is easily discolored, excellent weather resistance may be secured by removing dextrose.

In Chemical Formula 1, $M_1$ and $M_2$ are the same or different from each other, and are each independently Na or K, preferably Na.

Chemical Formula 1, preferably, $R_1$ and $R_2$ are the same or different from each other, and $R_1$ and $R_2$ are each independently hydrogen or —(C=O)OM$_2$.

When the above conditions are satisfied, the grafting degree of a graft copolymer may be significantly increased, thereby improving appearance properties, such as colorability, and securing weather resistance.

Preferably, the activator includes a compound represented by Chemical Formula 2 below.

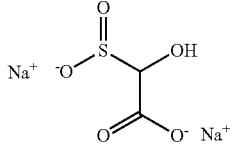

[Chemical Formula 2]

Preferably, the activator according to the present invention is continuously fed for a certain period of time to maintain excellent activity and improve the grafting degree of a graft copolymer. In addition, to achieve continuous feeding, the activator preferably is fed after being mixed with a solvent. In this case, the solvent may be, for example, water.

In the present invention, "continuous feeding" is distinguished from "batch feeding". For example, "continuous feeding" means that, during polymerization reaction, feeding is performed for 10 minutes or more, 30 minutes or more, or 1 hour or more, preferably 2 hours or more in a dropwise manner, a little-by-little manner, a step-by-step manner, or a continuous flow manner.

Based on 100 parts by weight in total of monomers fed when preparing the graft copolymer, the activator may be fed in an amount of 0.01 to 1 part by weight or 0.1 to 0.8 parts by weight. Within this range, grafting degree may be significantly increased, thereby improving colorability and appearance properties.

In a preparation step performed by including the activator, one or more selected from the group consisting of compounds including divalent iron ions and chelating agents are preferably included.

In addition, to stably impart catalytic activity to a polymerization initiator, a compound including a divalent iron ion such as ferrous sulfate may be included in, for example, 0.0001 to 0.01 parts by weight based on 100 parts by weight in total of monomers used to prepare a graft copolymer, and chelating agents including sodium pyrophosphate and/or sodium ethylenediamine tetraacetate may be included in, for example, 0.001 to 0.1 parts by weight based on 100 parts by weight in total of monomers used to prepare a graft copolymer. Within this range, polymerization initiation may be further accelerated, and the weather resistance of a prepared polymer may be improved.

For example, in the step of preparing a graft copolymer according to the present invention, a conventional reducing agent such as dextrose may not be used. In this case, weather resistance may be improved.

For example, graft copolymer latex obtained through the step of preparing a rubber core and a (co)polymer shell may have a coagulum content of 1% or less, preferably 0.5% or less, more preferably 0.1% or less. Within this range, the productivity of a resin, mechanical strength, and appearance properties may be improved.

In the present invention, the weight of coagulum generated in a reactor, the total weight of rubber, and the weight of monomers are measured, and coagulum content (%) may be calculated by substituting the measured values into Equation 1 below.

Solid coagulum (%)=(Weight of coagulum generated in reactor (g)/total weight of rubber and monomers (g))×100   [Equation 1]

The graft copolymer latex may be prepared in a powder form through conventional processes including coagulation, washing, drying, and the like. For example, to prepare the graft copolymer latex in a powder form, a metal salt or an acid may be added to the graft copolymer latex, and then coagulation may be performed at 60 to 100° C., followed by aging, dehydration, washing, and drying. However, the present invention is not limited thereto.

For example, the present invention may include a method of preparing a graft copolymer, the method including a core preparation step of preparing a rubber core by adding and polymerizing a monomer including an alkyl (meth)acrylate;

and a shell preparation step of preparing a shell by adding and graft-polymerizing an emulsifier and a monomer including an alkyl methacrylate compound in the presence of the prepared rubber core. The method may also be defined with or limited to the above description.

As another example, the present invention may include a method of preparing a graft copolymer, the method including a seed preparation step (a) of preparing a polymer seed by polymerizing a monomer including an alkyl (meth)acrylate; a core preparation step (b) of preparing a rubber core by adding and polymerizing a monomer including an alkyl (meth)acrylate in the presence of the prepared polymer seed; and a shell preparation step (c) of preparing a shell by adding and graft-polymerizing an emulsifier and a monomer including an alkyl methacrylate in the presence of the prepared rubber core. The method may also be defined with or limited to the above description.

Other conditions not specified in the method for preparing the graft copolymer described above, that is, polymerization conversion rate, reaction pressure, reaction time, gel content, and the like are particularly limited when these conditions are within ranges commonly used in the technical field. Also, these conditions may be selectively performed as needed.

B) Matrix Resin

A matrix resin according to the present invention is a thermoplastic resin that serves to impart excellent colorability by lowering refractive index.

The matrix resin preferably includes a poly(alkyl methacrylate) resin, more preferably a polymethylmethacrylate resin. In this case, excellent weather resistance and appearance properties may be secured.

For example, the poly(alkyl methacrylate) resin may further include an alkyl acrylate. In this case, impact resistance may be excellent.

For example, the alkyl acrylate may be included in an amount of 0.1 to 20% by weight, preferably 1 to 15% by weight, more preferably 1 to 10% by weight in the poly(alkyl methacrylate) resin. Within this range, impact resistance may be excellent.

For example, the matrix resin may have a weight average molecular weight of 50,000 to 200,000 g/mol, preferably 80,000 to 150,000 g/mol, more preferably 90,000 to 130,000 g/mol. Within this range, gloss, processability, and weather resistance may be excellent.

In the present invention, unless otherwise defined, weight average molecular weight may be measured using gel permeation chromatography (GPC, Waters Breeze). As a specific example, weight average molecular weight may be measured using tetrahydrofuran (THF) as an eluate through gel permeation chromatography (GPC, Waters Breeze). In this case, weight average molecular weight is obtained as a relative value to a standard polystyrene (PS) specimen.

For example, the poly(alkyl methacrylate) resin may be prepared by mixing a crosslinking agent, an initiator, and a monomer including an alkyl methacrylate and then performing bulk polymerization, solution polymerization, suspension polymerization, or emulsion polymerization, preferably suspension polymerization or emulsion polymerization.

Initiators commonly used to prepare a poly(alkyl methacrylate) resin may be used as the initiator of the present invention without particular limitation. For example, an azo initiator such as 2,2'-azobis 2'4-dimethyl-valeronitrile is preferably used as the initiator.

When necessary, substances required for reaction, such as solvents and emulsifiers, and conditions, such as polymerization temperature and polymerization time, which should be added or changed depending on the above-described polymerization methods, may be appropriately selected according to a polymerization method used to prepare a poly(alkyl methacrylate) resin, without particular limitation.

C) Thermoplastic Resin Composition

For example, the thermoplastic resin composition of the present invention may include 20 to 80% by weight of the graft copolymer and 20 to 80% by weight of the matrix resin, preferably 30 to 70% by weight of the graft copolymer and 30 to 70% by weight of the matrix resin, most preferably 40 to 60% by weight of the graft copolymer and 40 to 60% by weight of the matrix resin. Within this range, colorability, impact resistance, and weather resistance may be excellent.

For example, the thermoplastic resin composition may have a refractive index of greater than 1.46 and less than 1.49, 1.47 or more and less than 1.488, or greater than 1.47 and less than 1.488, preferably greater than 1.46 and 1.485 or less, more preferably greater than 1.46 and less than 1.485, most preferably greater than 1.46 and 1.48 or less. Within this the thermoplastic resin range, composition may have an advantage in expressing a deep black color due to excellent colorability.

For example, based on 100 parts by weight in total of the graft copolymer and the matrix resin, the thermoplastic resin composition may include an alkyl acrylate-aromatic vinyl compound-vinyl cyanide compound copolymer in an amount of 0 to 10 parts by weight, preferably 1 to 10 parts by weight, more preferably 1 to 5 parts by weight. Within this range, impact strength and processability may be significantly improved.

For example, the alkyl acrylate-aromatic vinyl compound-vinyl cyanide compound copolymer may be a copolymer prepared by graft-polymerizing an aromatic vinyl compound and a vinyl cyanide compound onto alkyl acrylate rubber having an average particle size of 100 to 500 nm. Within this range, gloss and processability may be excellent.

As a more specific example, the alkyl acrylate-aromatic vinyl compound-vinyl cyanide compound copolymer may be a copolymer prepared by graft-polymerizing 30 to 60% by weight of an aromatic vinyl compound and 10 to 20% by weight of a vinyl cyanide compound onto 20 to 60% by weight of alkyl acrylate rubber having an average particle size of greater than 100 nm and 500 nm or less. Within this range, gloss and processability may be excellent.

As another example, the alkyl acrylate-aromatic vinyl compound-vinyl cyanide compound copolymer may be a copolymer prepared by graft-polymerizing 30 to 50% by weight of an aromatic vinyl compound and 10 to 15% by weight of a vinyl cyanide compound onto 40 to 60% by weight of alkyl acrylate rubber having an average particle size of 200 to 400 nm. Within this range, gloss and processability may be excellent.

The method of preparing the thermoplastic resin composition of the present invention includes a step of mixing and extruding the thermoplastic resin composition of the present invention. In this case, impact strength may be good, and weather resistance may be excellent. In particular, the thermoplastic resin composition may have an advantage in expressing a deep black color due to excellent colorability.

For example, the extruding step may be performed at 190 to 260° C. and 100 to 300 rpm, preferably at 200 to 240° C. and 150 to 200 rpm. Within this range, a thermoplastic resin composition having excellent processability and desired physical properties may be prepared.

In the method of preparing the thermoplastic resin composition, when mixed, one or more additives selected from the group consisting of a flame retardant, a lubricant, an antibacterial agent, a release agent, a nucleating agent, a plasticizer, a heat stabilizer, an antioxidant, a light stabilizer, a pigment, a dye, and a compatibilizer may be further included. Based on 100 parts by weight in total of a composition including a graft copolymer and a matrix resin, the additives are preferably included in an amount of 0.1 to 10 parts by weight, more preferably 1 to 7 parts by weight, most preferably 1 to 5 parts by weight. Within this range, the desired effect of the additives may be fully expressed without deterioration in the inherent physical properties of a resin.

For example, the lubricant may be selected from ethylene bis stearamide, oxidized polyethylene wax, metallic stearates, and various silicone oils, and may be used in an amount of 0.1 to 5 parts by weight, more preferably 0.1 to 2 parts by weight based on 100 parts by weight in total of a composition including a graft copolymer and a matrix resin.

D) Molded Article

A molded article of the present invention is manufactured using the thermoplastic resin composition of the present invention. In this case, impact strength may be good, and weather resistance may be excellent. In particular, the molded article may have an advantage in expressing a deep black color due to excellent colorability.

The molded article is preferably an automotive exterior material, more preferably an unpainted product, such as a filler, or a lamp housing. In this case, impact strength, weather resistance, and colorability required by the molded article may be achieved.

For example, the present invention may include a method of manufacturing a molded article, the method including a step of injecting the thermoplastic resin composition of the present invention or the pellet thereof.

For example, the injection step may be performed at 190 to 260° C. and 30 to 80 bar, preferably at 200 to 240° C. and 40 to 60 bar. Within this range, processability may be improved, and the desired levels of impact strength, weather resistance, and colorability may be achieved.

For example, the molded article may have a blackness (L value) of less than 25.0, preferably 24.5 or less, more preferably 24.0 or less, as a preferred example, 24.5 to 20, as a more preferred example, 24 to 22. Within this range, overall physical property balance and colorability may be excellent.

Other conditions not specified in the thermoplastic resin composition and the molded article described above are particularly limited when these conditions are within ranges commonly used in the art to which the preset invention pertains. Also, these conditions may be appropriately selected as needed.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

Example 1

<Seed Preparation Step>

5 parts by weight of butyl acrylate, 1.4 parts by weight of sodium dodecyl sulfate, 0.05 parts by weight of ethylene glycol dimethacrylate, 0.05 parts by weight of allyl methacrylate, 0.1 parts by weight of potassium hydroxide, and 60 parts by weight of distilled water were fed into a nitrogen-substituted reactor batchwise, temperature was raised to 70° C., 0.05 parts by weight of potassium persulfate was added to initiate reaction, and then polymerization was performed for 1 hour. The average particle diameter of a rubber polymer seed obtained after reaction was 45 nm, and the refractive index thereof was 1.46.

<Polymer Core Preparation Step>

A mixture obtained by adding 45 parts by weight of butyl acrylate, 0.7 parts by weight of sodium dodecyl sulfate, 0.2 parts by weight of ethylene glycol dimethacrylate, 0.2 parts by weight of allyl methacrylate, 35 parts by weight of distilled water, and 0.1 parts by weight of potassium persulfate to the polymer seed was continuously fed into a reactor at 70° C. for 2.0 hours. After feeding, polymerization was further performed for 1 hour. The average particle diameter of a rubber polymer obtained after reaction was 100 nm, and the refractive index thereof was 1.46.

<Polymer Graft Shell Preparation Step>

Polymerization was performed while continuously feeding a mixture obtained by uniformly mixing 23 parts by weight of distilled water, 45 parts by weight of methyl methacrylate, 5 parts by weight of butyl acrylate, 1.5 parts by weight of potassium rosinate as an emulsifier, 0.1 parts by weight of n-octyl mercaptan, and 0.1 parts by weight of cumene hydroperoxide as an initiator; an aqueous solution (concentration: 5% by weight) containing 0.3 parts by weight of 2-hydroxy-2-sulfinato acetic acid disodium salt as an activator; and a mixed liquid containing 0.03 parts by weight of pyrophosphoric acid sodium and 0.0006 parts by weight of ferrous sulfide into the reactor containing the obtained core at 75° C. for 3 hours. After completion of continuous feeding, polymerization was further performed at 75° C. for 1 hour, followed by cooling to 60° C. to terminate polymerization and obtain a graft copolymer latex. The average particle diameter of the graft copolymer obtained after reaction was 125 nm, and the shell refractive index thereof was 1.487. In addition, the total refractive index of the graft copolymer was 1.4735, and the grafting degree thereof was 70%.

Preparation of Graft Copolymer Powder 1.0 part by weight of an aqueous solution containing calcium chloride was applied to the prepared (meth)acrylate graft copolymer latex, coagulation was performed at 60 to 85° C. under atmospheric pressure, aging was performed at 70 to 95° C., dehydration and washing were performed, and then drying was performed with 80° C. hot blast for 2 hours to prepare a graft copolymer powder.

Preparation of Matrix Resin 95 parts by weight of methyl methacrylate, 5 parts by weight of methyl acrylate, 200 parts by weight of distilled water, 0.3 parts by weight of polyvinyl alcohol as a suspension agent, and 0.3 parts by weight of n-octyl mercaptan were fed batchwise into a nitrogen-substituted reactor, the internal temperature of the reactor was raised to 80° C., 0.1 parts by weight of AIBN as an initiator was added thereto to initiate reaction, polymerization was performed for 70 minutes while maintaining the internal temperature of the reactor at 80° C., and then the temperature of the reactor was raised to 110° C. for 30 minutes to perform additional polymerization. The polymerized beads were washed using a dehydrator and dried in a fluid bed dryer at 80° C. for 2 hours. The molecular weight of the prepared polymethylmethacrylate resin was 120,000 g/mol, and the refractive index thereof was 1.487.

Preparation of Thermoplastic Resin Composition 50 parts by weight of the graft copolymer powder, 50 parts by weight of the polymethylmethacrylate resin, 1.5 parts by weight of a lubricant, 1.0 part by weight of an antioxidant, 1.0 part by weight of an ultraviolet light stabilizer, and 1 part by weight of a black colorant were added and mixed. This mixture was prepared in a pellet form using a 36 pi extrusion kneader at a cylinder temperature of 220° C., and the pellet was injected to prepare a specimen for measuring physical properties. At this time, the refractive index of an entire thermoplastic resin composition was 1.4813. In addition, difference between the refractive index of a shell and a matrix resin and the refractive index of rubber was 0.027, and difference in refractive index between the shell and the matrix resin was 0.0021.

Example 2

The preparation process was performed in the same manner as in Example 1, except that, in the seed preparation step, 4.5 parts by weight of butyl acrylate and 0.5 parts by weight of methyl methacrylate were used instead of 5 parts by weight of butyl acrylate, and 1.6 parts by weight of sodium dodecyl sulfate was used; and 40.5 parts by weight of butyl acrylate and 4.5 parts by weight of methyl methacrylate were used instead of 45 parts by weight of butyl acrylate in the core preparation step. In this case, the grafting degree of a graft copolymer was 58%, the refractive index of rubber was 1.463, and the refractive index of the graft copolymer was 1.475. In addition, the refractive index of an entire thermoplastic resin composition was 1.482. In addition, difference between the refractive index of a shell and a matrix resin and the refractive index of rubber was 0.024, and difference in refractive index between the shell and the matrix resin was 0.0021.

Example 3

The preparation process was performed in the same manner as in Example 1, except that, in the seed preparation step, 4.0 parts by weight of butyl acrylate and 1 part by weight of methyl methacrylate were used instead of 5 parts by weight of butyl acrylate, and 1.8 parts by weight of sodium dodecyl sulfate was used: and 36 parts by weight of butyl acrylate and 9 parts by weight of methyl methacrylate were used instead of 45 parts by weight of butyl acrylate in the core preparation step. In this case, the grafting degree of a graft copolymer was 49%, the refractive index of rubber was 1.466, and the refractive index of the graft copolymer was 1.4765. In addition, the refractive index of an entire thermoplastic resin composition was 1.4828, difference between the refractive index of a shell and a matrix resin and the refractive index of rubber was 0.021, and difference in refractive index between the shell and the matrix resin was 0.0021.

Example 4

The preparation process was performed in the same manner as in Example 1, except that, in the matrix resin preparation step, 90 parts by weight of methyl methacrylate and 10.0 parts by weight of butyl acrylate instead of methyl acrylate were used. In this case, the refractive index of a matrix resin was 1.487, and the refractive index of a graft copolymer was 1.4735. In addition, the refractive index of an entire thermoplastic resin composition was 1.48, difference between the refractive index of a shell and a matrix resin and the refractive index of rubber was 0.027, and difference in refractive index between the shell and the matrix resin was 0.0000.

Example 5

The preparation process was performed in the same manner as in Example 1, except that 40 parts by weight of methyl methacrylate and 10 parts by weight of butyl acrylate were used in the graft shell preparation step, and 80 parts by weight of methyl methacrylate and 20 parts by weight of butyl acrylate instead of methyl acrylate were used in the matrix resin preparation step. The refractive index of a matrix resin was 1.484, and the refractive index of a graft copolymer was 1.472. In addition, the refractive index of an entire thermoplastic resin composition was 1.478, difference between the refractive index of a shell and a matrix resin and the refractive index of rubber was 0.024, and difference in refractive index between the shell and the matrix resin was 0.0000.

Example 6

The preparation process was performed in the same manner as in Example 1, except that 1.8 parts by weight of sodium dodecyl sulfate, 0.15 parts by weight of ethylene glycol dimethacrylate, and 0.15 parts by weight of allyl methacrylate were used when preparing a seed, and 0.3 parts by weight of ethylene glycol dimethacrylate and 0.3 parts by weight of allyl methacrylate were used when preparing rubber core. The average particle diameter of an obtained seed was 30 nm, and the average particle diameter of a rubber polymer was 60 nm. In addition, the grafting degree of a graft copolymer was 55%. In addition, the refractive index of an entire thermoplastic resin composition was 1.4813, difference between the refractive index of a shell and a matrix resin and the refractive index of rubber was 0.024, and difference in refractive index between the shell and the matrix resin was 0.0021.

Example 7

The preparation process was performed in the same manner as in Example 1, except that 65 parts by weight of butyl acrylate, 0.3 s by weight of ethylene glycol dimethacrylate, and 0.3 parts by weight of allyl methacrylate were used when preparing a rubber core, and a mixture obtained by uniformly mixing 27 parts by weight of methyl methacrylate, 3 parts by weight of butyl acrylate, 1.5 parts by weight of potassium rosinate as an emulsifier, 0.6 parts by weight of n-octyl mercaptan, and 0.6 parts by weight of cumene hydroperoxide as an initiator; an aqueous solution (concentration: 5% by weight) containing 0.18 parts by weight of 2-hydroxy-2-sulfinato acetic acid disodium salt as an activator; 0.02 parts by weight of pyrophosphoric acid sodium; and 0.0004 parts by weight of ferrous sulfide were used when preparing a shell. In this case, the grafting degree of a graft copolymer was 35%, and the refractive index of the graft copolymer was 1.4681. In addition, the preparation process was performed in the same manner as in Example 1, except that 35 parts by weight of a graft copolymer powder and 65 parts by weight of a polymethylmethacrylate resin as a matrix resin were used when preparing a thermoplastic resin composition. In this case, the refractive index of an entire thermoplastic resin composition was 1.482, difference between the refractive index of a shell and a matrix resin and the refractive index of rubber was 0.0291, and difference in refractive index between the shell and the matrix resin was 0.0021.

Example 8

The preparation process was performed in the same manner as in Example 1, except that 4.5 parts by weight of butyl acrylate, 0.4 parts by weight of styrene, and 0.1 parts by weight of acrylonitrile were used instead of 5 parts by weight of butyl acrylate when preparing a seed, and 40.5 parts by weight of butyl acrylate, 3.6 parts by weight of styrene, and 0.9 parts by weight of acrylonitrile were used instead of 45 parts by weight of butyl acrylate when preparing rubber core. The average particle diameter of a seed was 40 nm, the average particle diameter of a rubber core was 95 nm, the refractive index of rubber was 1.4716, the refractive index of a graft copolymer was 1.4793, and the grafting degree of the graft copolymer was 60%. In addition, the refractive index of an entire thermoplastic was 1.4842, difference between the resin composition refractive index of a shell and a matrix resin and the refractive index of rubber was 0.0175, and difference in refractive index between the shell and the matrix resin was 0.0021.

Example 9

The preparation process was performed in the same manner as in Example 3, except that 47.5 parts by weight of methyl methacrylate, 2 parts by weight of styrene, and 0.5 parts by weight of acrylonitrile were used instead of 45 parts by weight of methyl methacrylate and 5 parts by weight of butyl acrylate when preparing a shell, and 95 parts by weight of methyl methacrylate, 4 parts by weight of styrene, and 1 part by weight of acrylonitrile were used instead of 95 parts by weight of methyl methacrylate and 5 parts by weight of methyl acrylate when preparing a matrix resin. The refractive index of a graft copolymer was 1.48, the grafting degree of the graft copolymer was 45%, and the refractive index of the shell and the matrix resin was 1.4943. In addition, the refractive index of an entire thermoplastic resin composition was 1.487, difference between the refractive index of the shell and the matrix resin and the refractive index of rubber was 0.0283, and difference in refractive index between the shell and the matrix resin was 0.0000.

Example 10

The preparation process was performed in the same manner as in Example 1, except that, when preparing a thermoplastic resin composition, 3 parts by weight of a large-diameter graft copolymer powder (ASA SA927, LG Chemical Co.) containing acrylate rubber having an average particle diameter of 300 nm was additionally used.

Comparative Example 1

The preparation process was performed in the same manner as in Example 1, except that, when preparing a shell, 36.5 parts by weight of styrene and 13.5 parts by weight of butyl acrylate were used instead of 45 parts by weight of methyl methacrylate and 5 parts by weight of butyl acrylate, and 0.1 parts by weight of t-dodecyl mercaptan was used instead of n-octyl mercaptan. In this case, the grafting degree of a graft copolymer was 30%, the refractive index of a shell was 1.56, and the refractive index of the graft copolymer was 1.51. In addition, the refractive index of an entire thermoplastic resin composition was 1.499, difference between the refractive index of the shell and the matrix resin and the refractive index of rubber was 0.1, and difference in refractive index between the shell and the matrix resin was 0.37.

Comparative Example 2

The preparation process was performed in the same manner as in Example 1, except that 0.8 parts by weight of sodium dodecyl sulfate was used when preparing a core. In this case, the average particle diameter of a polymer seed was 63 nm, and the average particle diameter of a rubber core was 130 nm.

Comparative Example 3

The preparation process was performed in the same manner as in Example 1, except that and an aqueous solution (concentration: 5% by weight) containing 1.2 parts by weight of n-octyl mercaptan, 0.18 parts by weight of dextrose, 0.02 parts by weight of pyrophosphoric acid sodium, and 0.0004 parts by weight of ferrous sulfide as an activator instead of the mixed liquid was used when preparing a shell. In this case, the grafting degree of a graft copolymer was 19%.

Comparative Example 4

The preparation process was performed in the same manner as in Example 1, except that 30 parts by weight of butyl acrylate, 0.4 parts by weight of ethylene glycol dimethacrylate, and 0.4 parts by weight of allyl methacrylate were used when preparing rubber core. In this case, the grafting degree of a graft copolymer was 120%.

Comparative Example 5

The preparation process was performed in the same manner as in Example 1, except that 40 parts by weight of methyl methacrylate, 8 parts by weight of styrene, and 2 parts by weight of acrylonitrile were used instead of 45 parts by weight of methyl methacrylate and 5 parts by weight of butyl acrylate when preparing a shell. The refractive index of a shell was 1.5072, and the refractive index of a graft copolymer was 1.4836. In addition, the refractive index of an entire thermoplastic resin composition was 1.4868, difference between the refractive index of the shell and a matrix resin and the refractive index of rubber was 0.0472, and difference in refractive index between the shell and the matrix resin was 0.0181.

Comparative Example 6

The preparation process was performed in the same manner as in Example 1, except that, when preparing a seed, 3.7 parts by weight of butyl acrylate and 1.3 parts by weight of styrene were used instead of 5 parts by weight of butyl acrylate, and 1.7 parts by weight of sodium dodecyl sulfate was used, and when preparing rubber core, 33.3 parts by weight of butyl acrylate and 11.7 parts by weight of styrene were used instead of 45 parts by weight of butyl acrylate. In this case, the average particle diameter of a seed was 45 nm, the average particle diameter of a rubber core was 100 nm, the refractive index of rubber was 1.494, the refractive index of a graft copolymer was 1.4915, and the grafting degree of the graft copolymer was 50%. In addition, the refractive index of an entire thermoplastic resin composition was 1.49, difference between the refractive index of a shell and a matrix resin and the refractive index of rubber was 0.005, and difference in refractive index between the shell and the matrix resin was 0.0000.

Comparative Example 7

The preparation process was performed in the same manner as in Example 1, except that 30 parts by weight of butyl acrylate, 2.5 parts by weight of sodium dodecyl sulfate, 0.4 parts by weight of ethylene glycol dimethacrylate, and 0.4 parts by weight of allyl methacrylate were used when preparing rubber core without the seed preparation process, and 63 parts by weight of methyl methacrylate, 7 parts by weight of butyl acrylate, 1.5 parts by weight of potassium rosinate as an emulsifier, and 0.13 parts by weight of n-octyl mercaptan were used when preparing a shell. The average particle diameter of an obtained rubber core was 36 nm, the average particle diameter of a graft copolymer obtained after reaction was 55 nm, and the shell refractive index of the graft copolymer was 1.487. In addition, the total refractive index of the graft copolymer was 1.4789, and the grafting degree thereof was 110%. The refractive index of an entire thermoplastic resin composition was 1.49, difference between the refractive index of the shell and the matrix resin and the refractive index of rubber was 0.027, and difference in refractive index between the shell and the matrix resin was 0.003.

Test Examples

The properties of the thermoplastic resin compositions prepared in Examples 1 to 10 and Comparative Examples 1 to 6 were measured using the following methods, and the results are shown in Table 1 below.

Colorability (blackness): Color L values were measured using a color meter (Color Eye 7000A) in accordance with a CIE1976 L*a*b* color system. In this case, a case of L=100 indicates pure white, and a case of L=0 indicates pure black. Blackness is inversely proportional to L value.

Impact strength (kgf/cm$^2$): The Izod impact strength of a ¼" specimen was measured according to the ASTM D256 test standard.

Weather resistance: A test for measuring weather resistance was performed using an accelerated weathering test device (Weather-O-meter, Ci4000, xenon arc lamp, Quartz (inner)/S.Boro (outer) filters, irradiance: 0.55 W/m$^2$ at 340 nm, ATLAS Co.) for 3,000 hours under the SAE J1960 conditions.

$\Delta E$ below is an arithmetic mean value before and after the accelerated weathering test. As a $\Delta E$ value approaches zero, the degree of weather resistance increases.

$$\Delta E = \sqrt{(L'-L)^2 + (a'-a)^2 + (b'-b)^2}$$

Gray scale: Weather resistance was evaluated according to the standard gray color chart for fading colors. As a gray scale value increases, the degree of weather resistance increases.

Gloss (45°): Gloss was measured at 45° using a gloss meter according to ASTM D528. As a gloss value increases, the degree of surface gloss increases.

Average particle diameter: An average particle diameter was measured using a Nicomp 380 device (PSS) according to a dynamic light scattering method.

Refractive index: Powder was pressed at 190° C., and the refractive index of the powder was measured using a refractometer (REICHERT MARK).

Grafting degree: A graft copolymer powder was dissolved in acetone, stirred for 24 hours, and centrifuged at 20,000 rpm for 3 hours to separate an insoluble fraction and a soluble fraction. Then, the insoluble fraction was dried for 24 hours, the content of the insoluble fraction was measured, and a grafting degree was calculated according to the following equation.

Grafting degree (%)=(Content of insoluble fraction−rubber content of graft copolymer)/rubber content of graft copolymer×100

TABLE 1

| Classification | Color-ability | Impact strength | Weather resistance | Gray scale | Gloss |
|---|---|---|---|---|---|
| Example 1 | 23.6 | 8.8 | 1.6 | Level 4 | 120 |
| Example 2 | 23.8 | 8.3 | 1.5 | Level 4 | 125 |
| Example 3 | 23.9 | 7.1 | 1.3 | Level 4 | 130 |
| Example 4 | 23.5 | 9.5 | 1.7 | Level 4 | 115 |
| Example 5 | 23.3 | 10.2 | 1.9 | Level 4 | 108 |
| Example 6 | 23.4 | 7.5 | 1.4 | Level 4 | 128 |
| Example 7 | 23.9 | 8.3 | 1.5 | Level 4 | 101 |
| Example 8 | 24.0 | 7.2 | 2.1 | Level 4 | 119 |
| Example 9 | 24.4 | 8.1 | 2.3 | Level 4 | 106 |
| Example 10 | 24.3 | 12.3 | 2.5 | Level 4 | 100 |
| Comparative Example 1 | 25.6 | 8.9 | 3.9 | Level 2 or 3 | 89 |
| Comparative Example 2 | 24.8 | 9.2 | 3.1 | Level 3 | 101 |
| Comparative Example 3 | 25.2 | 3.5 | 2.1 | Level 3 | 100 |
| Comparative Example 4 | 24.0 | 3.1 | 2.0 | Level 4 | 127 |
| Comparative Example 5 | 25.1 | 4.5 | 2.8 | Level 3 | 103 |
| Comparative Example 6 | 23.8 | 3.4 | 3.0 | Level 3 | 123 |
| Comparative Example 7 | 24.1 | 2.1 | 2.1 | Level 4 | 125 |

As shown in Table 1, it can be confirmed that, compared to Comparative Examples 1 and 6 outside the refractive index range of the present invention, Comparative Examples 2 and 7 outside the rubber particle diameter range of the present invention, Comparative Examples 3 and 4 outside the grafting degree range of the present invention, and Comparative Example 5 outside the blackness range of the present invention, the thermoplastic resin compositions (Examples 1 to 10) according to the present invention have excellent weather resistance and colorability while having impact strength equal or superior to that of the thermoplastic resin compositions of Comparative Examples.

The invention claimed is:
1. A thermoplastic resin composition, comprising:
a graft copolymer containing a rubber core and a copolymer shell surrounding the rubber core; and
a matrix resin,
wherein the thermoplastic resin composition comprises 20 to 80% by weight of the graft copolymer and 20 to 80% by weight of the matrix resin, based on 100% by weight in total of the graft copolymer and the matrix resin,
wherein the rubber core has an average particle diameter of 50 to 100 nm,
the graft copolymer has a grafting degree of 30 to 80%,
difference in refractive index between the rubber core, the copolymer shell, and the matrix resin is less than 0.04, wherein the difference in refractive index represents a difference between the maximum refractive index and the minimum refractive index between the rubber core, the copolymer shell, and the matrix resin, and
the thermoplastic resin composition has a refractive index of greater than 1.46 and less than 1.49,
wherein the rubber core consists of butyl acrylate homopolymer or butyl acrylate copolymerized with up to 20% by weight of methyl methacrylate,
wherein the copolymer shell consists of an alkyl methacrylate copolymerized with from 0.1 to 20% by weight of an alkyl acrylate,
wherein the graft copolymer does not include an aromatic vinyl compound or a vinyl cyanide compound,
wherein the matrix resin comprises a poly(alkyl methacrylate) resin, wherein the poly(alkyl methacrylate) resin is a homopolymer of alkyl methacrylate, or a poly(alkyl methacrylate) copolymer containing 0.1 to 20 wt % of alkyl acrylate in the poly(alkyl methacrylate) resin,
wherein the alkyl acrylate included in the copolymer shell or the matrix resin is an alkyl acrylate containing an alkyl group having 1 to 15 carbon atoms,
wherein the alkyl methacrylate included in the graft copolymer or the matrix resin is an alkyl methacrylate containing an alkyl group having 1 to 15 carbon atoms, and
wherein the thermoplastic resin composition has a weather resistance of 1.3 to 2.5 under SAE J1960 conditions.

2. The thermoplastic resin composition according to claim 1, wherein the amount of the alkyl acrylate comprised in the poly(alkyl methacrylate) copolymer is 5 to 20% by weight based on the weight of the poly(alkyl methacrylate) copolymer.

3. The thermoplastic resin composition according to claim 1, wherein the alkyl acrylate is comprised in an amount of 5 to 20% by weight in the copolymer shell.

4. The thermoplastic resin composition according to claim 1, wherein the amount of the alkyl acrylate comprised in the copolymer shell is 5 to 20% by weight based on the weight of the copolymer shell.

5. The thermoplastic resin composition according to claim 1, wherein the thermoplastic resin composition further comprises an alkyl acrylate-aromatic vinyl compound-vinyl cyanide compound copolymer in an amount of 1 to 5 parts by weight, based on 100 parts by weight in total of the graft copolymer and the matrix resin.

6. A molded article, comprising the thermoplastic resin composition of claim 1.

7. A method of preparing a thermoplastic resin composition, the method comprising a step of mixing and extruding the thermoplastic resin composition of claim 1.

8. The thermoplastic resin composition according to claim 1, wherein the thermoplastic resin composition has a blackness (L value) of less than 25.0.

9. The thermoplastic resin composition according to claim 1, wherein the rubber core has an average particle diameter of 60 to 100 nm.

10. The thermoplastic resin composition according to claim 1, wherein the alkyl acrylate included in the graft copolymer or the matrix resin includes butyl acrylate.

11. The thermoplastic resin composition according to claim 10, wherein the alkyl methacrylate included in the graft copolymer or the matrix resin includes methyl methacrylate.

* * * * *